United States Patent
Allgaier et al.

(10) Patent No.: US 9,157,508 B2
(45) Date of Patent: Oct. 13, 2015

(54) INDUSTRIAL GEAR MECHANISM

(71) Applicant: Siemens Aktiengesellschaft, München (DE)

(72) Inventors: Peter Allgaier, Dusslingen (DE); Wolfgang Schnurr, Nehren (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 205 days.

(21) Appl. No.: 13/632,830

(22) Filed: Oct. 1, 2012

(65) Prior Publication Data

US 2013/0125687 A1    May 23, 2013

(30) Foreign Application Priority Data

Sep. 29, 2011  (EP) .................................. 11183304

(51) Int. Cl.
*F16H 57/038* (2012.01)
*F16H 57/022* (2012.01)
(Continued)

(52) U.S. Cl.
CPC *F16H 1/20* (2013.01); *F16C 25/06* (2013.01); *F16C 35/063* (2013.01); *F16C 35/067* (2013.01); *F16H 1/203* (2013.01); *F16H 57/022* (2013.01); *F16H 57/023* (2013.01); *F16H 57/031* (2013.01); *F16H 57/038* (2013.01);
(Continued)

(58) Field of Classification Search
CPC ............ F16H 1/20; F16H 1/145; F16H 1/16; F16H 55/0853; F16H 9/06; F16H 1/22; F16H 1/10; F16H 1/227; F16H 1/24; F16H 1/14; F16H 1/203; F16H 1/033; F16H 57/038; F16H 57/04; F16H 57/022; F16H 57/023; F16H 57/031; F16H 57/025; F16H 57/02; F16H 57/021; F16H 35/06; F16H 35/063; F16H 35/067
USPC ............ 74/412 R, 413, 417, 420, 421 R, 423, 74/421 A, 426, 606 R, 606 A, 665 A, 74/665 GC, 665 B
See application file for complete search history.

(56) References Cited

U.S. PATENT DOCUMENTS 1,492,380 A * 4/1924 Leipert ....................... 180/24.09
1,894,927 A * 1/1933 Schmitter ....................... 74/420
(Continued)

FOREIGN PATENT DOCUMENTS

DE        1 000 654 A     1/1957
DE       102 52 192 A1    5/2004
(Continued)

*Primary Examiner* — Ha D Ho
*Assistant Examiner* — Jude Agendia
(74) *Attorney, Agent, or Firm* — Henry M. Feiereisen LLC.

(57) ABSTRACT

An industrial gear mechanism with a bevel gear stage having a-bevel gear and a bevel pinion in engagement therewith. The bevel gear and the bevel pinion are surrounded by a gear mechanism housing having bearing seats for a bevel gear shaft and a bevel pinion shaft. A first and a second bevel pinion shaft bearing are arranged in an O-arrangement, with the first bevel pinion shaft bearing arranged on a first end of the bevel pinion shaft facing the bevel pinion and the second bevel pinion shaft bearing arranged on a second end of the bevel pinion shaft remote from the bevel pinion. A gearwheel of a spur gear stage on the drive side is arranged axially between the first and second bevel pinion shaft bearings in fixed rotative connection with the bevel pinion shaft and in engagement with a drive pinion of the spur gear stage.

23 Claims, 10 Drawing Sheets

(51) Int. Cl.

| | | |
|---|---|---|
| *F16H 57/023* | (2012.01) | |
| *F16C 35/063* | (2006.01) | |
| *F16C 35/067* | (2006.01) | |
| *B60K 17/346* | (2006.01) | |
| *F16H 1/20* | (2006.01) | |
| *F16H 57/031* | (2012.01) | |
| *F16H 57/04* | (2010.01) | |
| *F16C 25/06* | (2006.01) | |

(52) U.S. Cl.
CPC ........ *F16H 57/0421* (2013.01); *F16H 57/0457* (2013.01); *F16H 57/0469* (2013.01); *F16H 57/0424* (2013.01); *F16H 57/0471* (2013.01); *F16H 57/0495* (2013.01); *F16H 2057/0221* (2013.01); *F16H 2057/0235* (2013.01); *Y10T 74/19674* (2015.01)

(56) References Cited

U.S. PATENT DOCUMENTS

| | | | | |
|---|---|---|---|---|
| 2,197,926 | A * | 4/1940 | Dunham | 254/10 C |
| 5,242,033 | A * | 9/1993 | Toraason | 184/6.12 |
| 6,349,781 | B1 * | 2/2002 | Kruse | 180/7.2 |
| 6,474,405 | B1 * | 11/2002 | Bell et al. | 165/41 |
| 6,889,572 | B2 * | 5/2005 | Nett | 74/410 |
| 7,703,352 | B2 * | 4/2010 | Legner et al. | 74/606 R |
| 7,707,909 | B2 * | 5/2010 | Linet et al. | 74/720 |
| 7,827,878 | B2 * | 11/2010 | Langer | 74/423 |
| 8,474,347 | B2 * | 7/2013 | Brick et al. | 74/416 |
| 2006/0089226 | A1 | 4/2006 | Garcia et al. | |
| 2006/0219037 | A1 * | 10/2006 | Inose et al. | 74/424 |
| 2007/0117672 | A1 | 5/2007 | Elvins | |
| 2008/0196527 | A1 | 8/2008 | Langer | |
| 2010/0307270 | A1 | 12/2010 | Brick et al. | |

FOREIGN PATENT DOCUMENTS

| | | |
|---|---|---|
| EP | 1 787 845 A1 | 5/2007 |
| EP | 1 961 993 A1 | 8/2008 |
| JP | 2002-213582 A | 7/2002 |
| WO | WO 94/10482 A1 | 5/1994 |

* cited by examiner

| | 1 | 2 | 3 | 4 | 5 | 6 | 7 | 8 | 9 | 10 |
|---|---|---|---|---|---|---|---|---|---|---|
| | Bi | a1 | q1 | b1 | e1 | a2 | QA =q1/e1 | QB =q1/b1 | QC =a2/a1 | |
| 1 | B1 | 48 | 120 | 100 | 118 | 132 | 1,02 | 1,20 | 2,75 | |
| 2 | B2 | 62 | 160 | 132 | 152 | 170 | 1,05 | 1,21 | 2,74 | |
| 3 | B3 | 62 | 160 | 132 | 152 | 170 | 1,05 | 1,21 | 2,74 | |
| 4 | B4 | 62 | 160 | 132 | 152 | 170 | 1,05 | 1,21 | 2,74 | |
| 5 | B5 | 74,5 | 198 | 175 | 195 | 215 | 1,02 | 1,13 | 2,89 | |
| 6 | B6 | 92,5 | 245 | 220 | 248 | 275 | 0,99 | 1,11 | 2,97 | |
| 7 | B7 | 113,5 | 300 | 280 | 310 | 340 | 0,97 | 1,07 | 3,00 | |
| 8 | B8 | 130 | 340 | 315 | 345 | 375 | 0,99 | 1,08 | 2,88 | |
| 9 | B9 | 153 | 405 | 375 | 415 | 450 | 0,98 | 1,08 | 2,94 | |
| 10 | B10 | 175 | 460 | 420 | 460 | 500 | 1,00 | 1,10 | 2,86 | |
| 11 | | | | | | | 0,97 | 1,07 | 2,74 | min. |
| 12 | | | | | | | 1,05 | 1,21 | 3,00 | max. |

FIG 7

|    | 1   | 2    | 3  | 4  | 5<br>R1<br>=α1/α3 | 6<br>α1+α2+α3 | 7    |
|----|-----|------|----|----|-------------------|---------------|------|
|    | Bi  | α1   | α2 | α3 |                   |               |      |
| 1  | B1  | 26   | 38 | 52 | 0,5               | 116,00        |      |
| 2  | B2  | 22,5 | 45 | 45 | 0,5               | 112,50        |      |
| 3  | B3  | 22,5 | 45 | 45 | 0,5               | 112,50        |      |
| 4  | B4  | 22,5 | 45 | 45 | 0,5               | 112,50        |      |
| 5  | B5  | 26   | 38 | 52 | 0,5               | 116           |      |
| 6  | B6  | 27,5 | 35 | 55 | 0,5               | 117,50        |      |
| 7  | B7  | 28,5 | 33 | 57 | 0,5               | 118,50        |      |
| 8  | B8  | 27,5 | 35 | 55 | 0,5               | 117,50        |      |
| 9  | B9  | 27,5 | 35 | 55 | 0,5               | 117,50        |      |
| 10 | B10 | 22,5 | 45 | 45 | 0,5               | 112,50        |      |
| 11 |     |      |    |    |                   | 112,50        | min. |
| 12 |     |      |    |    |                   | 118,50        | max. |

INDUSTRIAL GEAR MECHANISM

CROSS-REFERENCES TO RELATED APPLICATIONS

This application claims the priority of European Patent Application, Serial No. EP 11 183 304.2, filed Sep. 29, 2011, pursuant to 35 U.S.C. 119(a)-(d), the content of which is incorporated herein by reference in its entirety as if fully set forth herein.

BACKGROUND OF THE INVENTION

Gear mechanisms for industrial applications or wind power plants, in particular planetary gears, often play a particularly important role in industrial treatment processes and manufacturing processes. A wide range of complex requirements is set for industrial or wind power plant gear mechanisms. For example, one of these requirements is reliable operation, which has to be ensured over a lengthy period of use with minimal maintenance costs. System failures negatively affecting industrial treatment processes and manufacturing processes or energy production processes may be expensive, for example due to costly stoppage times. To monitor and ensure a reliable operation, therefore, numerous sensors or actuators are occasionally installed on rotating components in gear mechanisms.

A bevel spur gear mechanism is disclosed in EP 1 961 993 A1, in which a gear mechanism housing encloses one or more gear mechanism stages and a motor cage is provided for connection to an electric motor. The motor cage is connected via a spacer flange to the gear mechanism housing and the electric motor. In this case, a shaft on the drive side of a bevel gear stage is mounted in a flange bushing. The spacer flange and a front wall on the drive side of the gear mechanism housing have a common bore. Said common bore encloses the flange bushing of the shaft on the drive side. The flange bushing has a cylindrical outer surface which centers the gear mechanism housing, the spacer flange and the flange bushing relative to one another. The flange bushing, the spacer flange and the front wall on the drive side are connected together by screws.

A mounting for a bevel pinion shaft of a bevel spur gear mechanism in a bearing bushing is disclosed in DE 1 000 654 A, in which the bearing bushing is inserted into a long, one-piece housing bore. At one end, the bearing bushing has a flange. Moreover, the bearing bushing surrounds the bevel pinion shaft guided via roller bearings, and with further components forms a sub-assembly which may be easily premounted. The housing bore extends axially over an overall length of a cylindrical outer peripheral surface of the bearing bushing. Moreover, the housing bore easily aligns the premountable sub-assembly and has a high degree of rigidity. The required contact pattern in the tooth engagement of the bevel gear mechanism may be set via shims between the bearing bushing flange and the gear mechanism housing or via axially acting adjusting mechanisms.

The object of the present invention is to provide an industrial gear mechanism comprising at least one bevel gear stage, which permits a short overall length as well as simple and rapid mounting. In this case, the industrial gear mechanism is intended to be designed such that it is able to be inserted in a series of components of different sizes and is suitable for different types of motor.

SUMMARY OF THE INVENTION

The industrial gear mechanism according to the invention has a bevel gear stage, which comprises at least one bevel gear and a bevel pinion in engagement therewith. The bevel gear and the bevel pinion are surrounded by a gear mechanism housing, which comprises bearing seats for a bevel gear shaft and a bevel pinion shaft. A first and a second bevel pinion shaft bearing are provided in an O-arrangement. In this case, the first bevel pinion shaft bearing is arranged on a first end of the bevel pinion shaft facing the bevel pinion, whilst the second bevel pinion shaft bearing is arranged on a second end of the bevel pinion shaft remote from the bevel pinion. A gearwheel of a spur gear stage on the drive side is arranged axially between the first and second bevel pinion shaft bearings, said gearwheel being connected fixedly in terms of rotation to the bevel pinion shaft and being in engagement with a drive pinion of the spur gear stage. The gearwheel may be inserted into the gear mechanism housing through a housing opening on the drive side. Moreover, a bearing seat associated with the second bevel pinion shaft bearing is accessible via the housing opening on the drive side. A threaded bore is provided at the second end of the bevel pinion shaft, said threaded bore extending coaxially to the bevel pinion shaft. In this case, the threaded bore is freely accessible via the housing opening on the drive side. A bearing adjusting screw is inserted into the threaded bore, which is axially tightened against a surrounding washer. The washer bears in this case on the front face against an inner bearing ring of the second bevel pinion shaft bearing.

In order to mount in a reliable manner a shaft onto which static and dynamic forces act, the distance between two adjacent shaft bearings must not fall below a specific level. In many conventional bevel gear mechanisms, the gearwheel of a spur gear stage on the drive side is arranged floatingly on the bevel pinion shaft mounted in a separate bearing block. In order to be able to carry the shaft bearing and the gearwheel, the bevel pinion shaft thus has to have a minimum length which is greater than the bearing distance.

According to the invention, the gearwheel of the spur gear stage on the drive side is axially arranged between the first and second bevel pinion shaft bearings which are in an O-arrangement. More specifically, due to this positioning of the gearwheel a greater bearing distance between the bevel pinion shaft bearings may be required than with the floating arrangement of the gearwheel. As a result of the greater bearing distance, however, the following advantages result: smaller bearings may be used and better conditions are produced for the bevel gear toothing, i.e. the contact pattern becomes more uniform. Moreover, the space in any case required between the bearings may be used for receiving the gearwheel and the shaft may be of shorter configuration overall than in a floating arrangement.

Whilst in conventional bevel gear mechanisms it may be necessary to premount the bearing together with the bearings outside the gear mechanism housing, in order to achieve correct bearing adjustment, in the industrial gear mechanism according to the invention it may be dispensed with: the gearwheel and the second bevel pinion shaft bearing, optionally also an intermediate ring arranged therebetween, are inserted through the housing opening on the drive side into the gear mechanism housing and fixed in their mounting positions. Subsequently, the bevel pinion shaft and the first bevel pinion shaft bearing pushed thereon, may be inserted through a concentric recess on the gearwheel and through the second pinion shaft bearing, optionally also through the intermediate ring.

The arrangement according to the invention of the gearwheel of the spur gear stage between the two bevel pinion shaft bearings, therefore, results in a shorter overall length and a lower weight than in conventional bevel gear mechanisms with a floating arrangement of the gearwheel. The bevel pinion shaft bearings may be easily adjusted by means of the bearing adjusting screw freely accessible from the housing opening on the drive side. In this case, via a tightening torque and/or a tightening angle of the bearing adjusting screw, an adjustment of the bearing clearance of the bevel pinion shaft bearings may be reliably defined, in this case: of both the first and the second bevel pinion shaft bearings.

For adjusting the bearing clearance, the bearing adjusting screw is screwed into the thread of the threaded bore of the bevel pinion shaft, so that the screw is tightened. Due to the frictional connection created when tightening the screw, between the inner bearing ring of the second bevel pinion shaft bearing fastened fixedly in terms of rotation to the bevel pinion shaft and the washer bearing thereagainst on the front face, the bevel pinion shaft may also be fixed in terms of rotation by rotational fixing of the washer. In this manner, the bearing adjusting screw may be sufficiently rotated against the bevel pinion shaft until the axial tightening of the bearing adjusting screw against the surrounding washer has reached the desired level.

The ratio of the opening surface, also denoted as the connecting surface, of the housing opening on the drive side, to the axial distance of the input stage, i.e. the distance between the axle of the drive pinion and the spur gear meshing therewith, is such that a gearwheel of a spur gear stage on the drive side may be inserted through the housing opening on the drive side.

In order to have sufficient space for the bearing adjusting screw, the washer and the second bevel pinion shaft bearing, in spite of the shorter overall length of the gear mechanism, the housing cover closing the housing opening on the drive side is specifically configured. Preferably, the housing cover forms bearing seats for a shaft connected fixedly in terms of rotation to the drive pinion.

A motor-bearing shield integrated in the industrial gear mechanism forms the interface between a drive and the gear mechanism. This contributes to a compact design and reduces the interfaces and sealing points to be sealed. In this case, the motor-bearing shield is able to form the housing cover closing the housing opening on the drive side.

Preferably, the ratio of the opening surface of the housing opening on the drive side to the axial distance of the input stage is such that the mounting of a shaft connected fixedly in terms of rotation to the drive pinion and the bevel pinion shaft may take place inside the opening surface.

Preferably, the series of components comprises 2-stage bevel gear mechanisms and/or 3-stage bevel gear mechanisms, in each case in different sizes. For example, the series of components may comprise a 2-stage bevel gear mechanism in three sizes and a 3-stage bevel gear mechanism in twelve sizes.

According to a preferred development of the present invention, an outer bearing ring of the first bevel pinion shaft bearing bears on its front face remote from the first end of the bevel pinion shaft against the associated bearing seat. In a corresponding manner, an outer bearing ring of the second bevel pinion shaft bearing may bear on its front face remote from the second end of the bevel pinion shaft against the associated bearing seat. In this manner, the two bevel pinion shaft bearings may be mounted in a simple manner in an O-arrangement.

Preferably an inner bearing ring of the first bevel pinion shaft bearing bears on its front face facing the first end of the bevel pinion shaft against an annular supporting surface formed by the bevel pinion shaft or by the bevel pinion.

According to a further embodiment of the present invention an intermediate ring concentrically surrounding the bevel pinion shaft is arranged axially between the gearwheel of the spur gear stage and the inner bearing ring of the second bevel pinion shaft bearing. As a whole, this permits particularly simple mounting, by the gearwheel, the intermediate ring and the second bevel pinion shaft bearing being initially inserted through the housing opening on the drive side into the gear mechanism housing and fixed in their mounting positions. In this case, for example, the intermediate ring is able to center the gearwheel after insertion of the second bevel pinion shaft bearing in the associated bearing seat. This may take place in a preferred manner simply by the intermediate ring being arranged with clearance between the gearwheel and the inner bearing ring of the second bevel pinion shaft bearing, i.e. at a distance and not on the bearing block. Said clearance, preferably in the form of an air gap of narrow width, for example in the region of a few tenths of a millimeter, is important so that the bearing adjustment may be carried out by varying the tightening torque of the bearing adjusting screw. A bearing of the inner bearing ring of the second bevel pinion shaft bearing on the bearing block on the intermediate ring and the gearwheel of the spur gear stage on the drive side, would prevent a further increase of the tightening torque and/or the tightening angle and thus a further potential for bearing adjustment. After fixing the gearwheel, the intermediate ring and the second bevel pinion shaft bearing in their mounting positions, a premounted unit which comprises the bevel pinion shaft and the first bevel pinion shaft bearing pushed thereon, may be easily inserted for mounting through a concentric recess on the gearwheel and through the second pinion shaft bearing.

During operation of the gear mechanism, in particular with extreme loading of the spur gear, in which the spur gear may be axially displaced on the shaft, the intermediate ring may also serve as a spacer and/or spacer ring to prevent an axial displacement of the gearwheel of the spur gear stage on the drive side on the bevel pinion shaft in the direction of the second end of the bevel pinion shaft, where it could lead to a collision of the gearwheel with the gear mechanism housing parts.

Alternatively, the intermediate ring may be dispensed with when the spur gear is fastened by an interference fit on the bevel pinion shaft.

If the gearwheel of the spur gear stage is pushed onto the second end of the bevel pinion shaft, a front face portion of the gearwheel facing the first end of the bevel pinion shaft, corresponding to a preferred embodiment of the present invention, bears against an annular supporting surface formed by the bevel pinion shaft. The supporting surface for the gearwheel may, for example, be formed by a difference in diameter of the bevel pinion shaft. Correspondingly, the supporting surface for the inner bearing ring of the first bevel pinion shaft bearing may also be formed by a difference in diameter of the bevel pinion shaft or by a transition region between the bevel pinion shaft and the bevel pinion. Thus a particularly simple axial fixing is produced for the gearwheel and/or the first bevel pinion shaft bearing.

According to a preferred embodiment of the present invention, the lubrication of the industrial gear mechanism takes place by splash/spray lubrication with at least one cast projection and an oil pan. By the at least one cast projection, spray oil is able to be returned to the bearing. Preferably, the mounting is designed so that an oil pan for bearing lubrication is produced in the position M1 and M4. M1 denotes a position of the gear mechanism in which the axles of the drive shaft (=bevel pinion shaft) and the output shaft extend horizontally and the upper face of the gear mechanism housing is at the top. M4 denotes a position of the gear mechanism in which the axle of the drive shaft (=bevel pinion shaft) extends vertically, the axle of the output shaft extends horizontally and the rear face of the gear mechanism housing is at the bottom, i.e. the motor driving the drive shaft is arranged vertically above the gear mechanism. With regard to the definition of the terms "upper face" and "rear face" see FIG. 1 and the associated description.

Preferably, the washer is configured as an external hexagonal washer. In this case, a rotation of the washer may be prevented in a simple manner, for example by a wrench positioned on the washer or a further mounting tool for mass production. The central bore of the washer used for passing through the bearing adjusting screw may be smooth, i.e. configured without a thread. Preferably, the bore has a diameter which is adapted to a thread diameter of the bearing adjusting screw, i.e. it is possible that the washer surrounding the bearing adjusting screw is configured as a threaded washer. In this manner an optimal tightening of the washer may be set in a reproducible manner.

The object of the invention is also achieved by a series of components of industrial gear mechanisms, wherein the series of components has two or more different sizes.

Whilst adapter plates may be required, amongst other things, in conventional bevel gear mechanisms for connecting gear motors, the series of components according to the invention is formed from industrial gear mechanisms, which for a universal motor-gear mechanism-interface have adapted flange bores for mounting the motor.

By the selected standard mounting dimensions for axle heights, output shafts, bottom fastenings and flange fastenings, etc. the series of components according to the invention aids the known construction methods which have been established over the years. By means of the standard mounting dimensions, the series of components according to the invention is compatible with the most commonly available gear motors. For the user of the series of components, this means a free choice from the available gear motors and the possibility of simple and flexible updating of the drive solutions.

The industrial gear mechanisms of the series of components uses, amongst other things, the inserted pinion principle. By means of the inserted pinion principle, higher gear ratios are achieved relative to pushed-on motor pinions. This leads in many applications to a more economical solution, as a gear stage may be dispensed with. Moreover, cost advantages may be achieved as, due to the higher gear ratio, standard 4-pole motors instead of the more costly 6 or 8-pole motors may be selected. Additionally, using the inserted pinion principle, a lower peripheral speed of the first gear stage is possible, whereby the noise development is considerably reduced and churning losses reduced.

It is also possible that at least one industrial gear mechanism of the series of components uses the pushed-on pinion principle; in this case it is advantageous if motors for relatively high output use pushed-on pinions, whilst motors for relatively low output use inserted pinions.

BRIEF DESCRIPTION OF THE DRAWING

The present invention is described in more detail hereinafter by means of an exemplary embodiment with reference to the drawings, in which.

DETAILED DESCRIPTION OF PREFERRED EMBODIMENTS

Figure 1:
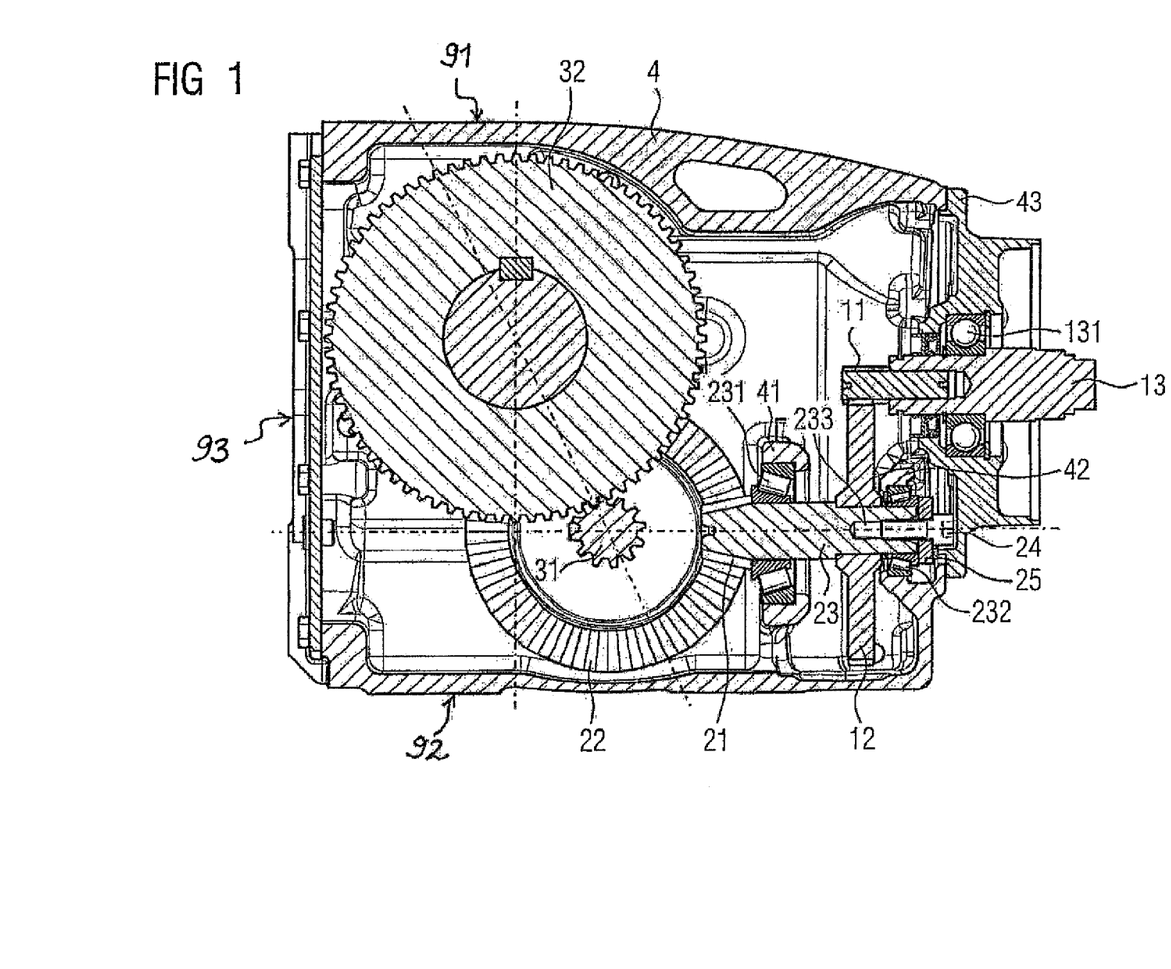
FIG. 1 shows a longitudinal sectional view of a gear mechanism with a bevel gear stage and two spur gear stages.

The gear mechanism shown in FIG. 1 comprises a gear mechanism housing 4 in which a spur gear stage on the drive side, a bevel gear stage and a spur gear stage on the output side are arranged. The spur gear stage on the drive side comprises a drive pinion 11 and a gearwheel 12 meshing therewith, which is connected fixedly in terms of rotation to a bevel pinion shaft 23 of the bevel gear stage. A housing opening on the drive side is closed by a housing cover 43, which forms bearing seats for a bearing 131 of a shaft 13 connected fixedly in terms of rotation to the drive pinion 11. The bevel gear stage comprises a bevel gear 22 and a bevel pinion 21 in engagement therewith, which is connected fixedly in terms of rotation to the bevel pinion shaft 23 or integrally formed thereon.

The gear mechanism housing 4 has an upper face 91, a lower face 92 and a rear face 93 opposing the housing opening on the drive side.

The gear mechanism housing 4, in addition to bearing seats for a bevel gear shaft connected fixedly in terms of rotation to the bevel gear 22, forms bearing seats 41, 42 for the bevel pinion shaft 23, which by means of a first 231 and a second bevel pinion shaft bearing 232 is mounted in an O-arrangement. The bevel gear shaft is connected fixedly in terms of rotation to a pinion 31 of the spur gear stage on the output side. The pinion 31 of the spur gear stage on the output side is in engagement with a gearwheel 32 which is connected fixedly in terms of rotation to an output shaft. The bearing seats 41, 42 for the bevel pinion shaft bearings 231, 232 in the present exemplary embodiment are formed in each case by a housing wall. The first bevel pinion shaft bearing 231 is arranged on a first end of the bevel pinion shaft 23 facing the bevel pinion 21, whilst the second bevel pinion shaft bearing 232 is arranged on a second end of the bevel pinion shaft 23 remote from the bevel pinion 21.

The gearwheel 12 of the spur gear stage on the drive side is arranged axially between the first and second bevel pinion shaft bearings 231, 232, and is able to be inserted into the gear mechanism housing 4 through the housing opening on the drive side. The bearing seat 42 associated with the second bevel pinion shaft bearing 232 is also accessible via the housing opening on the drive side. In the mounted state, the gearwheel 12 of the spur gear stage is pushed onto the second end of the bevel pinion shaft 23, and a front face portion of the gearwheel 12 facing the first end of the bevel pinion shaft 23 bears against an annular supporting surface formed by the bevel pinion shaft 23. The supporting surface for the gearwheel 12 in the present exemplary embodiment is formed by a difference in diameter of the bevel pinion shaft 23.

Figure 2:
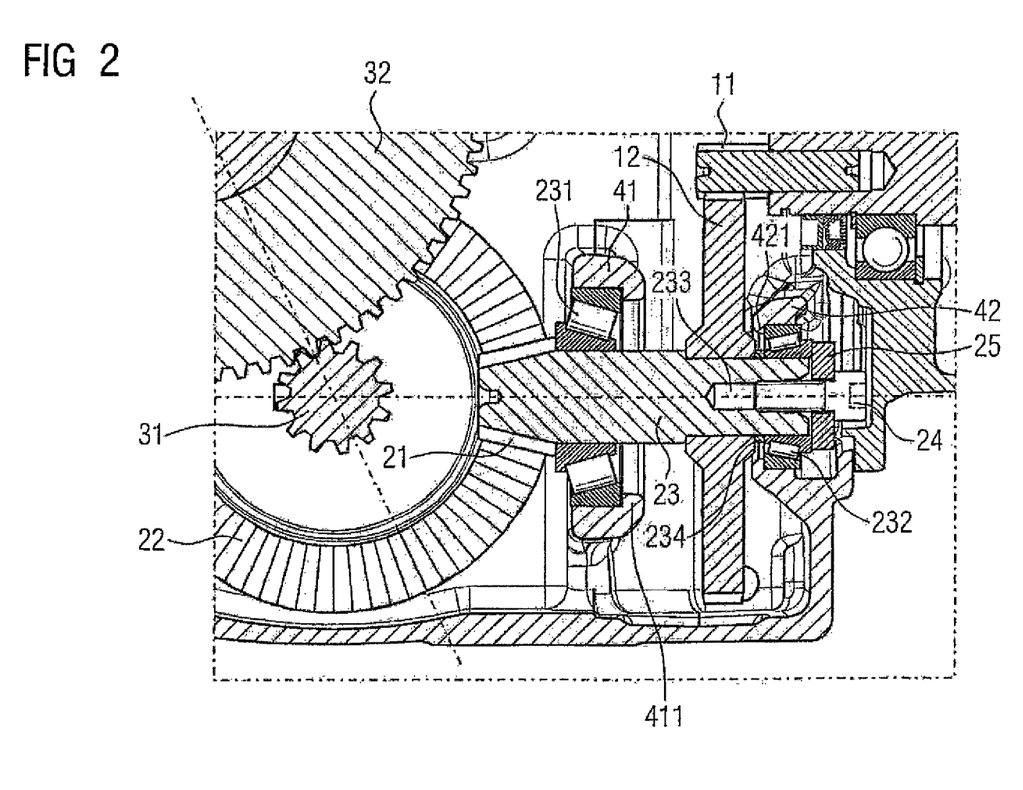
FIG. 2 shows a detail of the gear mechanism shown in FIG. 1 in a region of a spur gear stage on the drive side.

With reference to FIG. 2 in detail it may be seen that an intermediate ring 234 concentrically surrounding the bevel pinion shaft 23 is arranged axially between the gearwheel 12 of the spur gear stage and an inner bearing ring of the second bevel pinion shaft bearing 232. The intermediate ring 234 in this case bears with clearance on the front face against the gearwheel 12 and/or the inner bearing ring of the second bevel pinion shaft bearing 232. Moreover, on the second end of the bevel pinion shaft 23, a threaded bore 233 is provided which extends coaxially to the bevel pinion shaft 23. The threaded bore 233 is freely accessible via the housing opening on the drive side. A bearing adjusting screw 24 is inserted into the threaded bore, said bearing adjusting screw being axially tightened against a surrounding washer 25. The washer 25, which may be configured as a threaded washer, in this case bears on the front face against the inner bearing ring of the second bevel pinion shaft bearing 232. In the present exemplary embodiment, the bearing adjusting screw 24 inserted into the threaded bore 233 is configured as an inner or outer hexagonal screw, whilst the washer 25 is configured as an external hexagonal washer.

The bevel pinion shaft bearings 231, 232 may be easily adjusted by means of the bearing adjusting screw 24 freely accessible from the housing opening on the drive side. In this case, a bearing clearance adjustment of the bevel pinion shaft bearings 231, 232 may be reliably defined via a tightening torque and/or tightening angle of the bearing adjusting screw 24, in this case: both of the first and the second bevel pinion shaft bearings.

According to FIGS. 1 and 2, an outer bearing ring of the first bevel pinion shaft bearing 231 on its front face remote from the first end of the bevel pinion shaft 23, bears against the associated bearing seat 41. The bearing seat 41 of the first bevel pinion shaft bearing 231 comprises a supporting ring 411 which bears against the front face of the first bevel pinion shaft bearing 231 remote from the first end of the bevel pinion shaft 23. A lubricant accumulation edge may be additionally integrally formed on the inside on the supporting ring 411 of the first bevel pinion shaft bearing 231.

An inner bearing ring of the first bevel pinion shaft bearing 231 bears on its front face facing the first end of the bevel pinion shaft 23 against an annular supporting surface formed by the bevel pinion 21. In this case, the supporting surface is formed by a transition region between the bevel pinion shaft 23 and the bevel pinion 21. Alternatively, the supporting surface may also be formed by a difference in diameter of the bevel pinion shaft 23.

In the present exemplary embodiment, an outer bearing ring of the second bevel pinion shaft bearing 232 on its front face remote from the second end of the bevel pinion shaft 23 bears against the associated bearing seat 42. The bearing seat 42 of the second bevel pinion shaft bearing 232 comprises a supporting ring 421 which bears against the front face of the second bevel pinion shaft bearing 232 remote from the second end of the bevel pinion shaft 23. A lubricant accumulation edge may also be integrally formed on the inside on this supporting ring 421.

Figure 3:
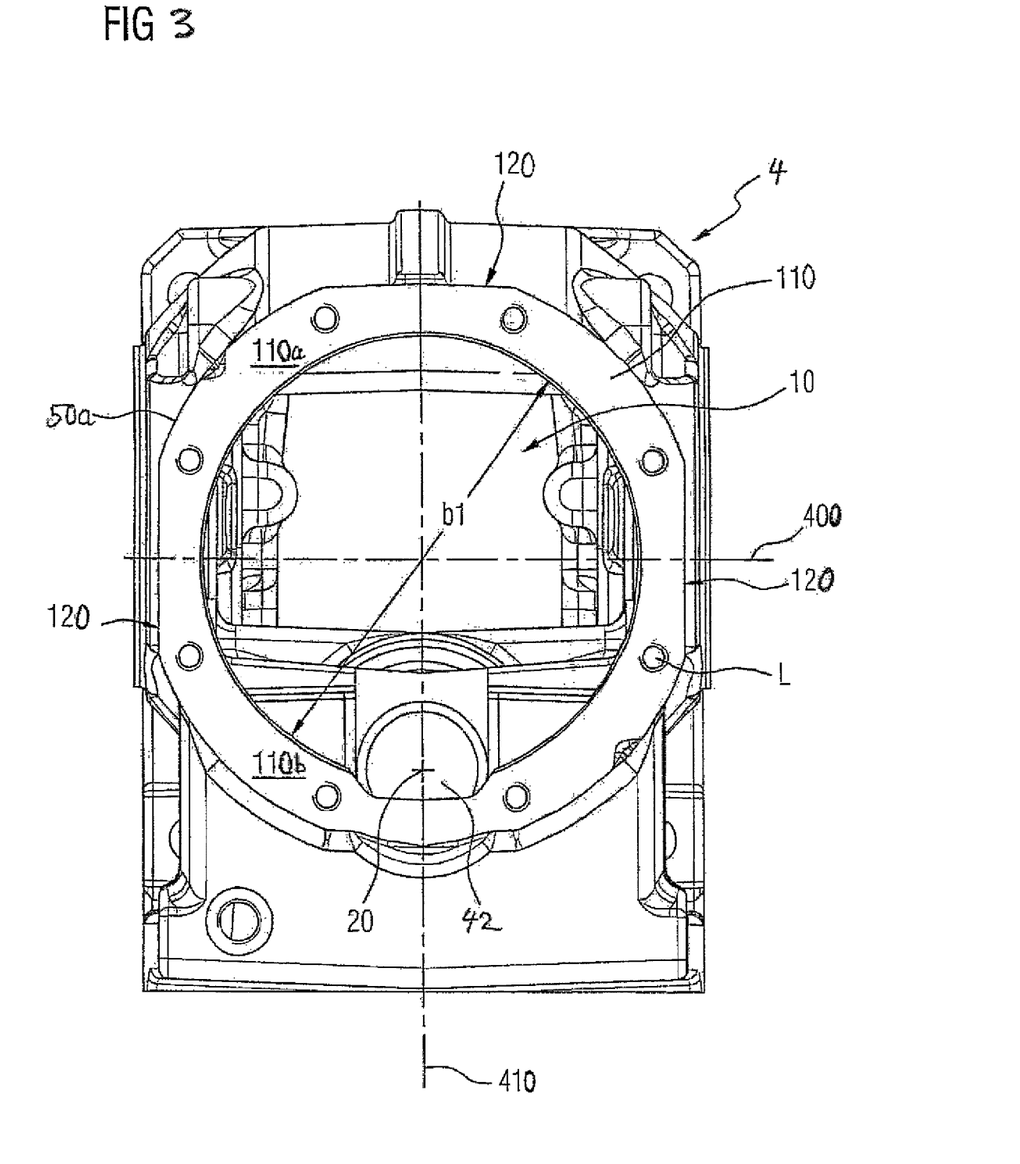
FIG. 3 shows a view of a gear mechanism housing with a view of a drive flange.

In the present exemplary embodiment, at least the spur gear stage on the drive side has splash lubrication, for which an oil pan is formed on a housing base, part of the gearwheel 12 being arranged inside said oil pan. Additionally, on the bearing seats of the bevel pinion shaft bearing, oil guide projections are integrally formed for returning spray oil into the respective bevel pinion shaft bearing. In particular, the housing cover 43 and a lower projection on the bearing seat 42 of the second bevel pinion shaft bearing 232 effect a collection and return of spray oil into the second bevel pinion shaft bearing 232. FIG. 3 shows a front view of the housing opening 10 on the drive side of a gear mechanism housing 4 which belongs to a series of components of industrial gear mechanisms having different gear mechanism sizes. In this case, FIGS. 1 and 2 show longitudinal sections of a bevel gear mechanism with the gear mechanism housing 4 shown in FIG. 3.

The housing opening 10 on the drive side is able to be closed by a housing cover, which is configured as a motor-bearing shield for fitting a motor. The axle 20 of the bevel pinion shaft, extending perpendicular to the plane of the drive flange 110 surrounding the housing opening 10, in the view shown in FIG. 3, is located within a minimum internal diameter b1 of the drive flange 110, i.e. viewed perpendicular to the plane of the drive flange 110.

The substantially circular drive flange 110 has on two opposing sides flattened portions 120 of the outer edge. Eight holes L are arranged in the drive flange 110, which are located on a circle of holes LK and are provided for receiving connecting screws. Four holes L are arranged in each half 110a and 110b of the drive flange 110 divided by a dividing line 400 of the flattened portions 120.

Figure 4:
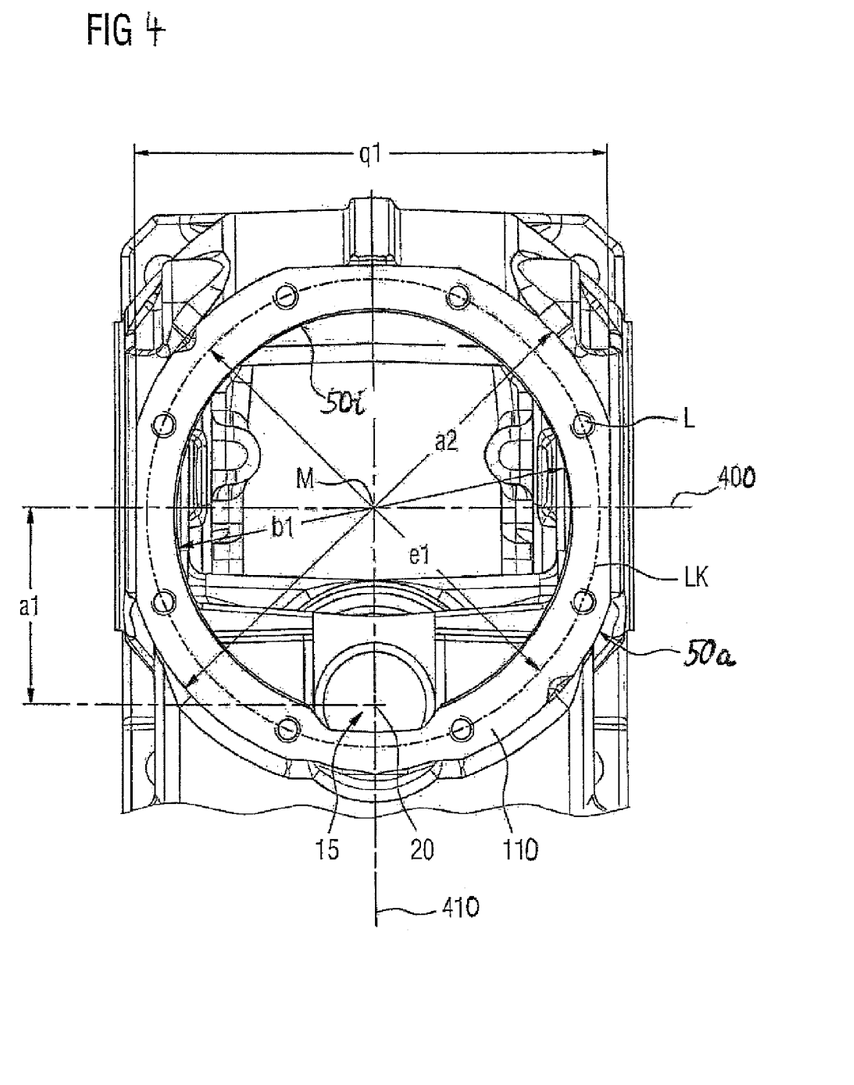
FIG. 4 shows a view as in FIG. 3, with an indication of the dimensions.

FIG. 4 shows the same view as in FIG. 3, wherein a series of dimensions are additionally provided which are important for the geometry of the gear mechanism housing of the series of components of the industrial gear mechanism.

The figure shows the axial spacing a1 of the first gear stage. In the bevel gear mechanism shown in FIGS. 1 and 2, said axial spacing a1 corresponds to the axial spacing between the bevel pinion shaft 23 and the drive pinion 11.

The figure also shows the spacing q1 of the horizontally opposing flattened portions, i.e. the length of the distance which connects the next two adjacent points of the opposing flattened portions 120 on the outer edge 50a of the drive flange 110. The spacing q1 corresponds to the minimum external diameter of the drive flange 110, measured along the dividing line 400.

The figure also shown the minimum internal diameter b1 of the drive flange 110. As the drive flange 110 on its inner edge 50i, in the region of the axis 20 has a recess 15, the smallest internal diameter IA has to be measured outside the recess 15, for example along the dividing line 400.

The figure also shows the diameter of the circle of holes e1, i.e. the diameter of the circle LK on which the holes L are arranged.

Moreover, the figure shows the maximum external diameter a2 of the drive flange 110. As the drive flange 110 on its outer edge 50a has flattened portions 120 in the region of the connecting line 400 and the transverse line 410 rotated by 90 degrees thereto, the maximum external diameter a2 outside the flattened portions 120 may be measured, for example in the diagonal between the dividing line 400 and the transverse line 410.

Figure 5:
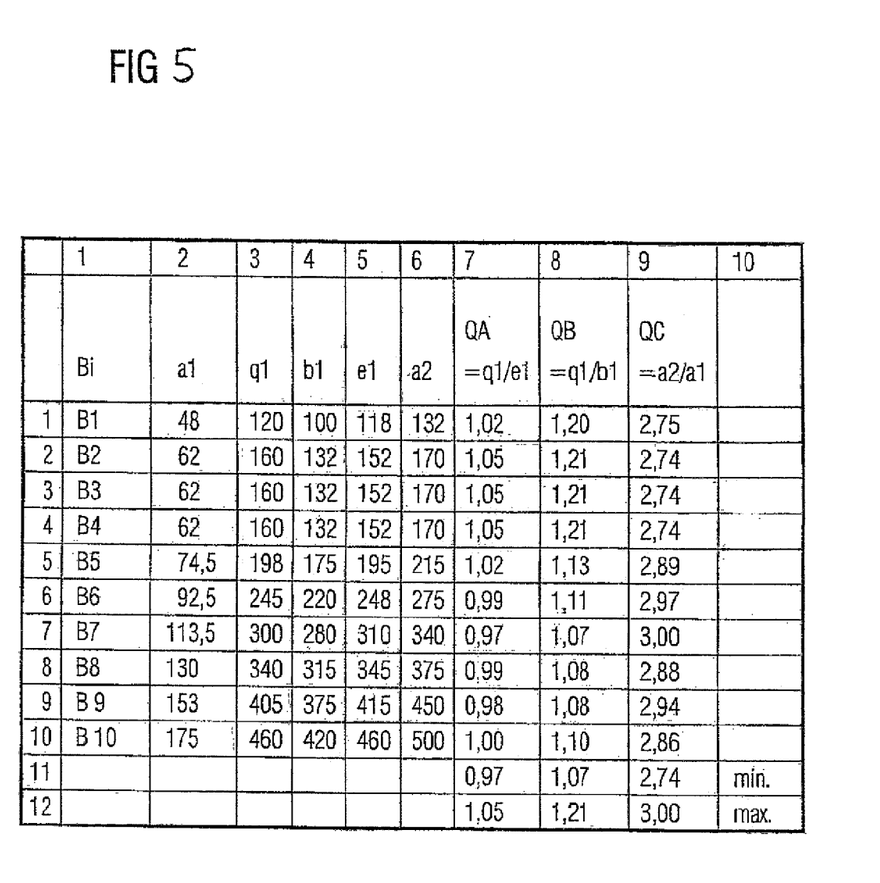
FIG. 5 shows a table comprising dimensions.

FIG. 5 shows a table of dimensions a1, q1, b1, e1 and a2 (see columns 2 to 6) and specific ratios QA, QB and QC of said dimensions (see columns 7 to 9). The ratio QA is the ratio of the distance q1 of the horizontally opposing flattened portions q1 to the diameter of the circle of holes e1. The ratio QB is the ratio of the spacing q1 of the horizontally opposing flattened portions q1 to the minimum internal diameter b1 of the drive flange 110. The ratio QC is the ratio of the maximum external diameter a2 of the drive flange 110 to the axial distance a1 of the first gear stage.

The dimensions and ratios are listed for ten different sizes Bi, as indicated in column 1. In rows 13 and 14 in each case the minimum and/or maximum values of the columns 7 to 9 are provided.

The values provided in FIG. 5 are in value ranges selected such that the shaft bearings, shafts and toothed portions of the gears are easily accessible through the housing opening. As a result, the mounting and maintenance is considerably simplified.

Figure 6:
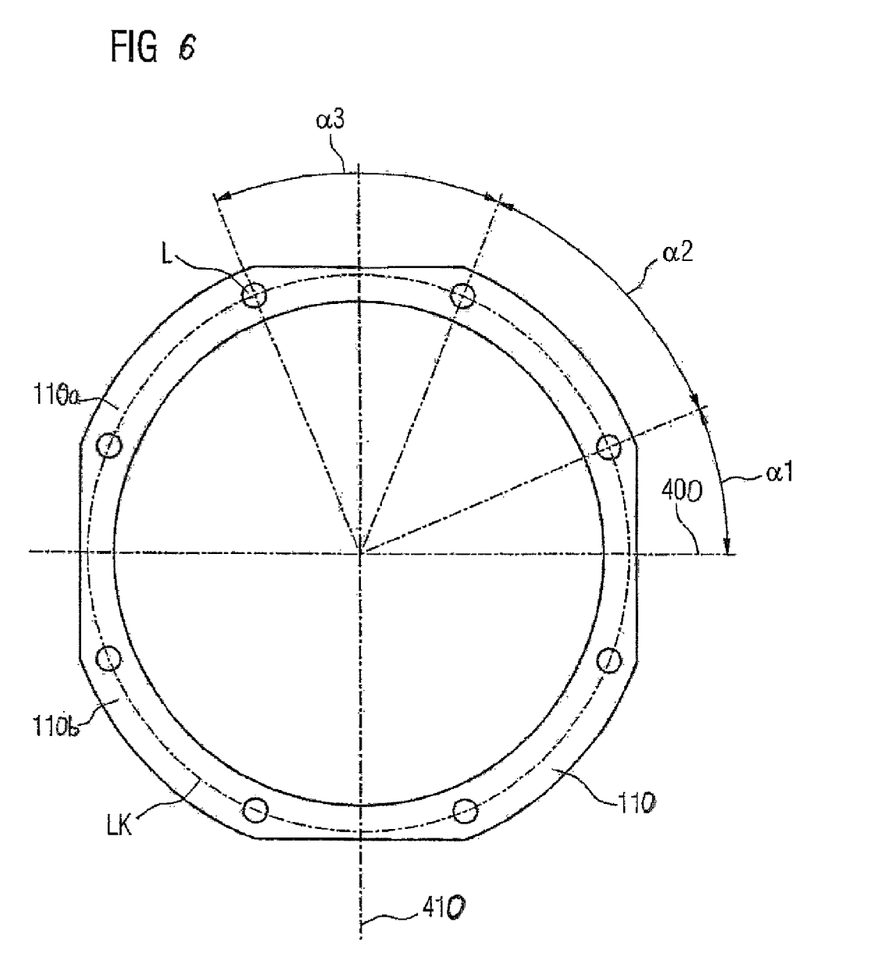
FIG. 6 shows a schematic view of a drive flange with an indication of the angles of the holes.

FIG. 6 shows a schematic view of a drive flange 110 with an indication of the angles α1, α2 and α3 of the holes L. The holes L located in each case in half 110a, 110b of the drive flange 110 on the circle of holes LK, are arranged in a predetermined angular pattern.

The apex of the angles α1, α2 and α3 of the three successive holes L, starting from the dividing lines 400, called the first, second and third holes, is the centerpoint M of the drive flange 110. The apex of the first angle α1 is the dividing line 400, and the other apex extends through the axis of the first hole L. The apex of the second angle α2 extends through the axis of the first hole L, and the other apex through the axis of the second hole L. The apex of the third angle α3 extends through the axis of the second hole L, and the other apex through the axis of the third hole L.

The fourth hole L located in the half 110a of the drive flange 110 is arranged symmetrically to the first hole L.

Figure 7:
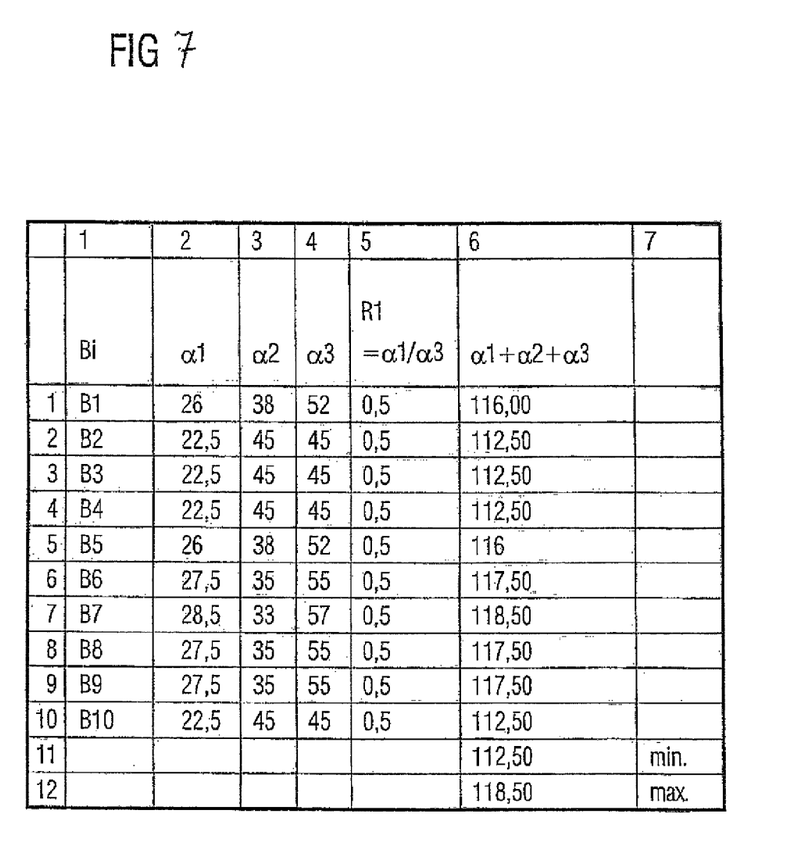
FIG. 7 shows a table comprising angles.

FIG. 7 shows a table of the angles α1, α2 and α3 (see columns 2 to 4) as well as a resulting ratio R1 (see column 5) and the total angle of the three angles (see column 6). The ratio R1 is the ratio of the first angle α1 to the third angle α3. The dimensions and ratios are listed for ten different sizes Bi, as shown in column 1. In lines 13 and 14, the minimum and/or maximum values of column 6 are provided.

The eight holes L of the drive flange 110 are arranged both point-symmetrically on the drive flange 110 relative to the centerpoint M of the drive flange 110, and also symmetrically on the drive flange 110 relative to the connecting line 400 and the transverse line 410. Thus the first angle α1 is half the size of the third angle α3, i.e. the ratio R1 is consistently 0.5.

The angles provided in FIG. 7 are in value ranges which are selected such that a hole pattern which is congruent for all gear mechanism housings is provided, whereby the interchangeability is increased and the bearing mounting simplified.

Figure 8:
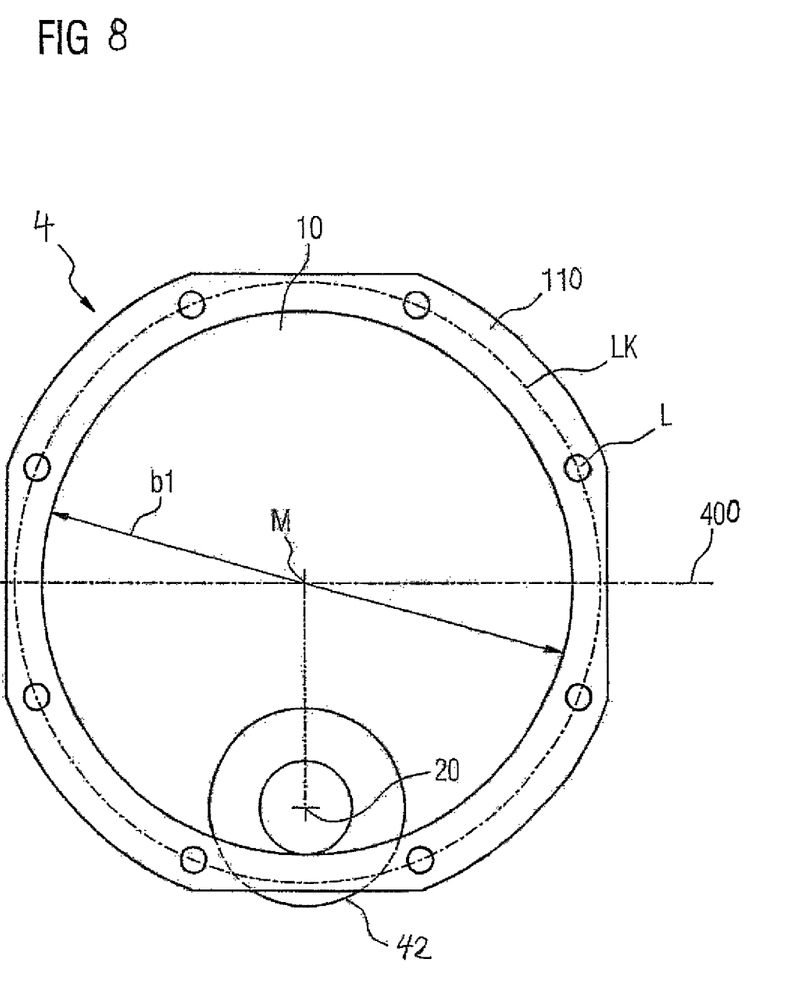
FIG. 8 shows a schematic view of a drive flange of a gear mechanism housing with an indication of bearing points for a bevel gear mechanism.

FIG. 8 shows a drive flange 110 of a gear mechanism housing 4 for a bevel gear mechanism. The axis 20 extending perpendicular to the plane of the drive flange 110 of the bearing seat 42 provided for receiving a bevel pinion shaft, is located in the view perpendicular to the plane of the drive flange 110, within the minimum internal diameter b1 of the drive flange 110. The two circles drawn around the lower axis 20 provide the internal and external diameters of the bearing point 42.

Figure 9:
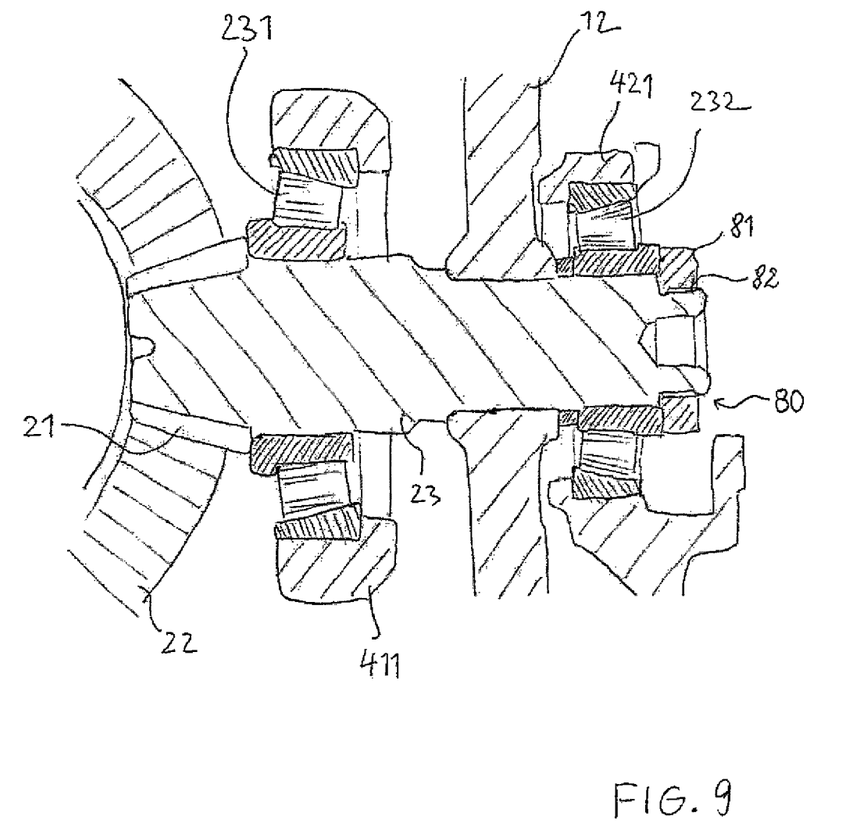
FIG. 9 shows a longitudinal sectional view of a bevel pinion shaft with an alternative bearing adjusting device.
Figure 10:
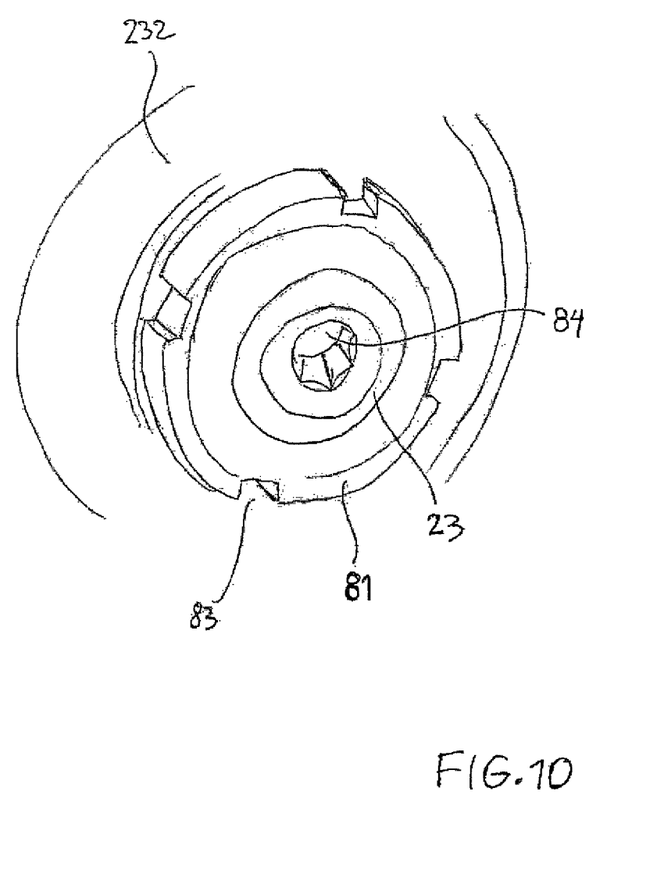
FIG. 10 shows a plan view of the shaft end of the bevel pinion shaft shown in FIG. 9.

FIGS. 9 and 10 show an embodiment of an industrial gear mechanism, wherein the bearing adjusting screw 24, the washer 25 surrounding said bearing adjusting screw, and the threaded bore 233 corresponding to the bearing adjusting screw 24, are replaced by an alternative bearing adjusting device 80. The bearing adjusting device 80 comprises a nut 81 and a corresponding external thread 82 on the shaft end on the drive side of the bevel pinion shaft 23. The shaft end on the drive side of the bevel pinion shaft 23 thus forms a threaded pin. In this case, the nut 81 which bears on the front face against an inner bearing ring of the second bevel pinion shaft bearing 232 may be screwed onto the external thread 81.

For positioning a tool for rotating the nut 81, the nut 81 has recesses 83 on its external periphery, as shown in FIG. 10. The nut 81 may also be configured as an external hexagonal nut, so that it may be tightened by means of a wrench, amongst other things. At the shaft end of the bevel pinion shaft 23, an axially arranged bore is formed with an internal hexagon, in order to be able to apply a counter torque when tightening the nut 81, so that the bevel pinion shaft 23 is fixed against rotation.

The bevel pinion shaft bearings 231, 232 may be easily adjusted by means of the bearing adjusting device 80, in particular the nut 81, freely accessible from the housing opening on the drive side. In this case, via a tightening torque and/or a tightening angle of the nut 81, a bearing clearance adjustment of the bearing pinion shaft bearing 231, 232 may be reliably defined, in this case: both of the first and the second bevel pinion shaft bearing.

Although the invention has been illustrated in detail and described in more detail by the preferred exemplary embodiments, the invention is not limited by the disclosed examples and other variants may be derived therefrom by the person skilled in the art, without departing from the protective scope of the invention.

The invention claimed is:

1. An assembly, comprising a plurality of industrial bevel gear mechanisms, each comprising:
    a bevel gear stage comprising at least one bevel gear and a bevel pinion in engagement with the at least one bevel gear,
    a gear mechanism housing surrounding the at least one bevel gear and the bevel pinion, said gear mechanism housing comprising bearing seats supporting a bevel gear shaft and a bevel pinion shaft,
    a first and second bevel pinion shaft bearing in an O-shaped arrangement, wherein the first bevel pinion shaft bearing is arranged on a first end of the bevel pinion shaft facing the bevel pinion, and wherein the second bevel pinion shaft bearing is arranged on a second end of the bevel pinion shaft remote from the bevel pinion,
    a spur gear stage on a drive side comprising a gearwheel arranged axially between the first and second bevel pinion shaft bearings, said gearwheel being connected with a rotation lock to the bevel pinion shaft and in engagement with a drive pinion of the spur gear stage, wherein the gearwheel is configured for insertion into the gear mechanism housing through a housing opening on the drive side, and wherein a bearing seat associated with the second bevel pinion shaft bearing is accessible via the housing opening on the drive side,
    a threaded bore disposed on the second end of the bevel pinion shaft, said threaded bore extending coaxially with the bevel pinion shaft, wherein the threaded bore is freely accessible via the housing opening on the drive side, and
    a bearing adjusting screw inserted into the threaded bore, said bearing adjusting screw being axially tightened against a surrounding washer, with a front face of the surrounding washer bearing against an inner bearing ring of the second bevel pinion shaft bearing;
    wherein the plurality of the bevel gear mechanisms include a first group of several bevel gear mechanisms all having one same number of stages and all having different sizes compare to each other, and also a second group of several bevel gear mechanisms all having another same number of stages which is different from the number of stages of the bevel gear mechanisms of the first group and also all having different sizes compare to each other.

2. The assembly of claim 1, wherein a front face remote from the first end of the bevel pinion shaft of an outer bearing ring of the first bevel pinion shaft bearing bears against a bearing seat of the bevel pinion shaft.

3. The assembly of claim 2, wherein the bearing seat of the first bevel pinion shaft bearing comprises a supporting ring, which bears against the front face of the first bevel pinion shaft bearing remote from the first end of the bevel pinion shaft.

4. The assembly of claim 3, wherein a lubricant accumulation edge is integrally formed on an inside on the supporting ring of the first bevel pinion shaft bearing.

5. The assembly of claim 2, wherein a front face facing the first end of the bevel pinion shaft of an inner bearing ring of the first bevel pinion shaft bearing bears against an annular supporting surface formed by the bevel pinion shaft or by the bevel pinion.

6. The assembly of claim 5, wherein the supporting surface for the first bevel pinion shaft bearing is formed by a difference in diameter of the bevel pinion shaft or by a transition region between the bevel pinion shaft and the bevel pinion.

7. The assembly of claim 1, wherein a front face remote from the second end of the bevel pinion shaft of an outer bearing ring of the second bevel pinion shaft bearing bears against the bearing seat of the bevel pinion shaft.

8. The assembly of claim 7, wherein the bearing seat of the second bevel pinion shaft bearing comprises a supporting ring which bears against the front face of the second bevel pinion shaft bearing remote from the second end of the bevel pinion shaft.

9. The assembly of claim 8, wherein a lubrication accumulation edge is integrally formed on an inside on the supporting ring of the second bevel pinion shaft bearing.

10. The assembly of claim 1, wherein the gearwheel of the spur gear stage is pushed onto the second end of the bevel pinion shaft and wherein a front face portion of the gearwheel facing the first end of the bevel pinion shaft bears against an annular supporting surface formed by the bevel pinion shaft.

11. The assembly of claim 10, wherein the supporting surface for the gearwheel is formed by a difference in diameter of the bevel pinion shaft.

12. The assembly of claim 1, wherein an intermediate ring concentrically surrounding the bevel pinion shaft is arranged axially between the gearwheel of the spur gear stage and the inner bearing ring of the second bevel pinion shaft bearing.

13. The assembly of claim 1, wherein the bearing adjusting screw inserted into the threaded bore is configured as an inner or outer hexagonal washer, and wherein the washer is configured as an external hexagonal washer.

14. The assembly of claim 1, wherein each of the bevel gear mechanisms further comprising:

a housing base with an oil pan to provide splash lubrication for at least the spur gear stage, with part of the gearwheel being arranged inside the oil pan, and an oil guide projection integrally formed on at least one bearing seat of the bevel pinion shaft bearing for returning spray oil into the first and second bevel pinion shaft bearings.

15. The assembly of claim 1, wherein the bearing seats for the first and second bevel pinion shaft bearings are formed by a housing wall.

16. The assembly of claim 1, wherein the housing opening on the drive side is closed by a housing cover which forms bearing seats for a shaft connected to the drive pinion with a rotation lock.

17. The assembly of claim 16, wherein the housing opening is surrounded by a substantially circular drive flange having a plurality of holes located on a circle and configured for receiving connecting screws.

18. The assembly of claim 17, wherein the drive flange has two opposite sides provided with flattened portions on outer edges and also has a dividing line extending between the flattened portions and dividing the drive flange into two halves each provided with some of the holes.

19. The assembly of claim 18, wherein the holes of the drive flanges has first, second, third and fourth holes provided in each of the halves on each side of the dividing line and angularly spaced from each other by angles having an apex in a centerpoint of the drive flange, wherein the angles include a first angle having a first apex which is the dividing line and a second apex which is an axis of the first hole, a second angle having a first apex which is the axis of the first hole and a second apex which is an axis of the second hole, a third angle having a first apex which the axis of the second hole and a second apex which is an axis of the third hole, and the fourth hole is located symmetrically to the first hole.

20. The assembly of claim 17, wherein the bevel pinion shaft has an axle extending perpendicular to the drive flange and located within a minimum internal diameter of the drive flange.

21. The assembly of claim 1, further comprising a spur gear stage arranged on an output side of the bevel gear stage.

22. The assembly of claim 1, wherein the assembly comprises at least two bevel gear mechanisms having a different number of stages.

23. The assembly of claim 1, wherein the bevel gear mechanisms are two and three-stage bevel gear mechanisms.

* * * * *

UNITED STATES PATENT AND TRADEMARK OFFICE
CERTIFICATE OF CORRECTION

PATENT NO. : 9,157,508 B2
APPLICATION NO. : 13/632830
DATED : October 13, 2015
INVENTOR(S) : Peter Allgaier et al.

Page 1 of 1

It is certified that error appears in the above-identified patent and that said Letters Patent is hereby corrected as shown below:

In The Claims

In column 10, claim 1, lines 56 and 61 replace "compare" with --compared--.

Signed and Sealed this
Tenth Day of May, 2016

Michelle K. Lee
*Director of the United States Patent and Trademark Office*